Sept. 29, 1953   J. T. BARRON   2,653,833
ROTARY PRESSURE FLUID SEAL
Filed Jan. 7, 1949
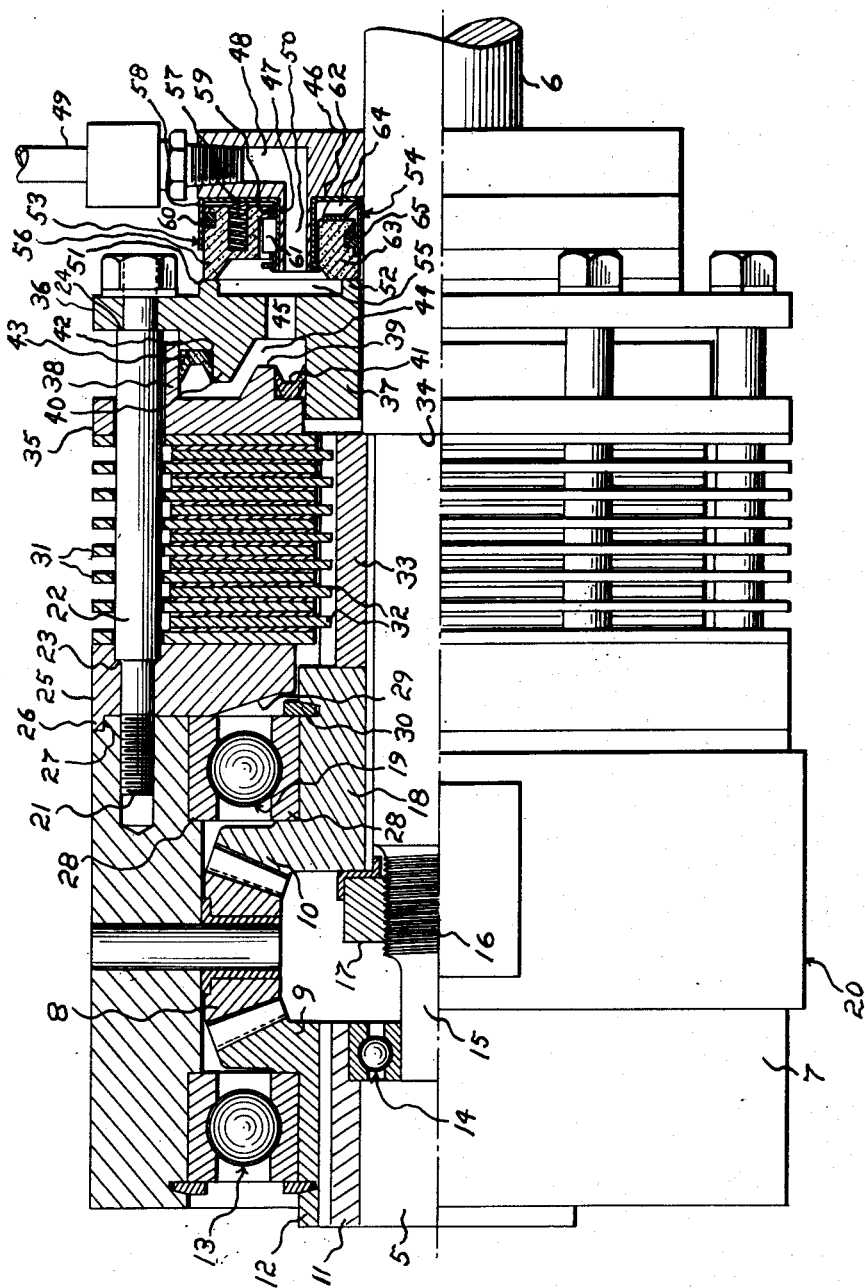
INVENTOR.
JOHN T. BARRON
BY
Abbott Spear
ATTORNEY Patented Sept. 29, 1953

2,653,833

UNITED STATES PATENT OFFICE 2,653,833

ROTARY PRESSURE FLUID SEAL

John T. Barron, South Easton, Mass., assignor to Charles E. Crofoot Gear Corp., South Easton, Mass., a corporation of Massachusetts Application January 7, 1949, Serial No. 69,669

2 Claims. (Cl. 285—9)

My present invention relates to clutches and particularly to hydraulically operated clutches.

The primary objects of my invention are to provide simple and reliable clutches that are adapted to withstand severe abuse so that they may be incorporated in reverse gear units for marine uses, for example, and ensure long and satisfactory service and be capable of being hydraulically operated thereby to provide maximum ease and convenience in operation.

In accordance with my invention, I provide a clutch adapted to meet these general objectives which consists of a backing member rotatable independently of the shaft to which it is to be coupled and an end plate axially spaced therefrom but mounted to rotate therewith. A plurality of clutch discs, at least one of which is slidably connected to the member and at least one of which is slidably supported by the shaft, are clamped together against the backing member by the actuating means.

Where the clutch actuating means are hydraulically operated, the clutch has an annular piston carried by the backing member to rotate therewith and the piston and the plate each has a pair of annular projections so disposed and spaced that corresponding projections mate throughout the effective axial stroke of the piston and establish a pressure chamber. Seals, located between mating projections, render the chamber pressure tight.

Rearwardly of the end plate, I provide a stationary member through which the shaft freely extends and which has a pressure supply conduit. A pair of axially yieldable rotary seals are carried by either the end plate or the stationary member in radially spaced relation to each other and to the shaft to establish an annular chamber and the plate and stationary member have ports communicating with the annular chamber and the piston and conduit, respectively, to provide a pressure tight connection between the rotatable pressure chamber and the stationary pressure source.

In the accompanying drawing, I have shown an illustrative embodiment of my invention from which these and other of its novel features and advantages will be readily apparent. The single figure of the drawing is a partly sectioned side view of a clutch in accordance with my invention incorporated with a reverse gear unit of the type shown in my co-pending application, Serial No. 782,918, filed October 29, 1947, now Patent No. 2,518,516, granted August 15, 1950.

In the illustrative embodiment of my invention shown in the drawing, I have indicated at 5 and 6, respectively, drive and driven shafts. While the housing 7 may be an element fast on the drive shaft, I have shown it as supporting pinions 8 meshing with bevel gears 9 and 10 and being preferably in the form of an open-ended cylinder, the inside diameter of which is greater than the diameter of the bevel gears.

While the bevel gear 9 may be slidably splined to the shaft 5, I have shown it as thus attached to a sleeve 11 anchored to the shaft 5. The gear 9 has a shoulder 12 between which and the adjacent end of the housing 7 is a ball bearing unit 13. The sleeve 11 extends slightly beyond the end of the shaft 5 to receive a ball bearing unit 14 which supports the extremity 15 of the driven shaft 6 which is threaded as at 16 to receive the lock nut 17 by which the bevel gear 10 is keyed to the shaft 6 and has a shoulder 18 between which and the housing 7 is a ball bearing unit 19.

By this construction, a simple and effective reverse gear unit is established. When the housing 7 is held against rotation as by the generally indicated brake 20, the driven shaft 6 rotates in a direction opposite to that of the drive shaft 5 and when the housing 7 is rotated with the driven shaft 6, a forward speed results. It is to the means to couple the shafts 5 and 6 that my present invention is primarily directed.

In accordance with my invention, I establish my clutch by means of studs 21 threaded into the rear face of the housing 7 in parallel with the shaft 6. I have shown each of the studs 21 as having an intermediate part 22 of increased diameter establishing spaced shoulders 23 and 24.

At 25, I have indicated a backing plate having countersunk holes so that it may be locked to the housing 7 by the studs 21 and receive within it their shoulders 23. I also form the plate 25 with an annular flange 26 which mates with a shoulder 27 on the adjacent end of the housing 7. As shown in the drawing, the backing plate 25 may be employed to lock the upper race 28 of the ball bearing unit 19 and have its inner face tapered as at 29 to provide clearance for a conventional retaining ring 30 holding in place the inner ball bearing race 28.

Slidably supported by the parts 22 of the studs are a plurality of clutch discs 31 which are separated from each other by clutch discs 32 slidably mounted on the spline member 33 keyed to the shaft 6 and seated against the driven shaft shoulder 34 by the anchored bevel gear 10.

Slidably mounted on the stud parts 22 is a pressure plate 35 and an end plate 36 is seated and locked against their shoulders 24. While any means may be employed to actuate the pressure plate 35 to cause it to clamp the clutch discs 31 and 32 against the backing plate 25, I prefer to employ fluid pressure. To accomplish that result, I form the end plate 36, through which the driven shaft 6 freely extends, with a cylindrical hub 37 which the pressure plate 35 is apertured to receive freely. The pressure plate 35 has an annular flange 38. The plates 35 and 36 have annular projections 39 and 40, respectively, with the projection 39 being spaced from the hub 37 to establish a recess for a suitable sealing ring 41 and the projection 40 has a shoulder 42 spaced from the flange 38 to define a recess for the sealing ring 43. In practice, adjacent faces of the projections 39 and 40 are complementally inclined and the flange 38 is dimensioned to engage the plate 36 to serve as a stop to prevent these complemental faces from coming into contact with each other in the disengaged position of the clutch. The plates 35 and 36 thus establish a pressure chamber 44 into which or from which fluid can flow through the port 45 in the plate 36.

At 46, I have shown a stationary support through which the driven shaft 6 freely extends and which has an annular extension 47 disposed towards the plate 36. The support 46 has a radial passage 48 to which a pressure supply and relief conduit 49 is connected and the extension 47 has a port 50 in communication with the passage 48 located between the annular ribs 51 and 52 on the rear face of the plate 36.

Rotary seals 53 and 54 are seated on the inner and outer surfaces of the support extension 47 and are in engagement with the ribs 51 and 52, respectively, to establish a pressure chamber 55.

The seal 53 includes a contact ring 56 yieldably maintained in sealing relation to the rib 51 by means of springs 57 seated on the carrier 58 which is substantially U-shaped in cross section to partially house the ring 56. A ring 59 is a press fit on the inner annular wall of the carrier 58 and defines with the contact ring 56 a passage in communication with its rear face so that fluid under pressure assists the springs 55 in maintaining the seal 53 effective. For that reason, a seal 60, preferably of the O-ring type, is disposed between the contact ring 56 and the outer annular wall of the carrier 58. The carrier 58, the ring 53, and the contact ring 56 are keyed together as at 61.

The rotary seal 54 is generally similar to the seal 53 and includes a carrier 62 of generally U-shaped section slidably supporting the sealing ring 63 yieldably pressed into sealing engagement with the rib 52 by the spring 64. The sealing ring 63 has a loose fit with respect to the outer wall of the carrier 62 so that fluid pressure contributes to the effectiveness of the seal and the ring 63 carries a sealing ring 65, preferably of the O-type, engaging the inner wall of the carrier 62.

The radially spaced seals 53 and 54 thus establish the outer and inner walls of the annular pressure chamber 55 between the stationary support 46 and the rotatable plate 36 enabling adequate operating pressures to be maintained while effectively preventing radial leakage.

In accordance with my invention, it will thus be apparent that my clutch is of simple and rugged construction and, where hydraulically operated, the pressure supply system to the rotatable clutch actuating piston from the stationary source is effectively sealed.

What I therefore claim and desire to secure by Letters Patent is:

1. A fluid seal for first and second members of which one is rotatable, said first member including an annular cylinder, said second member being held against rotation in spaced axial relation to said first member and having a pressure supply conduit, one of said members including a pair of radially spaced annular ribs, a pair of annular rotary seals of substantial axial length, said seals being carried by the other of said members and abutting the said ribs, said seals being of different diameters thereby to define the inner and outer walls of an annular chamber and being axially yieldable thereby to remain effective against leakage when fluid pressure is exerted to take up axial play between said members, and said first and second members each having a port in communication with said chamber and with said cylinder and said supply conduit respectively.

2. The seal of claim 1 in which the first member includes the ribs and the rotary seals are carried by the second member.

JOHN T. BARRON.

References Cited in the file of this patent

UNITED STATES PATENTS

| Number | Name | Date |
| --- | --- | --- |
| 1,254,951 | Ward | Jan. 29, 1918 |
| 2,018,014 | Fahrney | Oct. 22, 1935 |
| 2,108,165 | Criley | Feb. 15, 1938 |
| 2,237,400 | Washburn | Apr. 8, 1941 |
| 2,282,143 | Carter | May 5, 1942 |
| 2,360,489 | Gillett | Oct. 17, 1944 |
| 2,407,043 | Tremolada | Sept. 3, 1946 |
| 2,428,336 | Munschauer | Sept. 30, 1947 |
| 2,469,588 | Aschauer | May 10, 1949 |
| 2,511,520 | Walton | June 13, 1950 |
| 2,562,515 | Wemp | July 31, 1951 |
| 2,587,230 | Schaad | Feb. 26, 1952 |